US005957417A

United States Patent [19]

Yu

[11] Patent Number: 5,957,417

[45] Date of Patent: Sep. 28, 1999

[54] GUITAR STAND

[76] Inventor: Ming-Ti Yu, 122-5, Jun Liao Road, Feng Yuan, Taichung Shien, Taiwan

[21] Appl. No.: 08/998,569

[22] Filed: Dec. 28, 1997

[51] Int. Cl.$^{6}$ .................................................... F16M 11/38

[52] U.S. Cl. ............................ 248/166; 84/327; 403/87; 403/119

[58] Field of Search ................................ 248/166, 176.1, 248/164, 165, 167, 170, 434, 173, 168, 188.6, 188.7, 188.8, 371, 163.1, 431, 188; 403/87, 84, 119; 84/453, 327, 387 A, 329, 280

[56] References Cited

U.S. PATENT DOCUMENTS

| | | | |
|---|---|---|---|
| 5,383,634 | 1/1995 | Liao | 248/166 |
| 5,505,413 | 4/1996 | Hennessey | 248/166 |
| 5,664,756 | 9/1997 | Liao | 84/327 X |
| 5,713,547 | 2/1998 | Yu | 248/166 |
| 5,744,735 | 4/1998 | Liao | 84/327 |

*Primary Examiner*—Ramon O. Ramirez
*Assistant Examiner*—Stephen S. Wentsler

[57] ABSTRACT

A guitar stand has an adjustment joint, a support rod connected to the adjustment joint, two inner pipes connected to the adjustment joint, and two outer pipes receiving the inner pipes respectively. An upper block is disposed on the support rod. Two leg joints are connected to the outer pipes respectively. Two leg rods are connected to the leg joints respectively. Two brackets are disposed on the inner pipes respectively.

3 Claims, 8 Drawing Sheets

GUITAR STAND

BACKGROUND OF THE INVENTION

The present invention relates to a guitar stand. More particularly, the present invention relates to a guitar stand which can be easily detached.

Referring to FIG. 8, a conventional guitar stand has a lower rod 83 and three legs 81 connected by a four-way joint 82. An upper rod 80 is inserted in the lower rod 83. An upper U-shaped fork 86 extends from an upper end of the upper rod 80. A transverse pipe 84 is connected to the lower rod 83. A lower U-shaped fork 85 is inserted in the transverse pipe 84. Since the upper rod 80 is inserted in the lower rod 83 only, the two rods 80 and 83 are not fastened tightly. The upper rod 80 may fall down after a long period of usage. U.S. Pat. No. 5,713,547 discloses a guitar stand which is easily folded.

SUMMARY OF THE INVENTION

An object of the present invention is to provide a guitar stand which is easily folded.

Another object of the present invention is to provide a guitar stand which can lower the center of gravity of the guitar while the guitar is rested on the guitar stand.

Accordingly, a guitar stand comprises an adjustment joint, a support rod connected to the adjustment joint, two inner pipes connected to the adjustment joint, and two outer pipes receiving the inner pipes respectively. An upper block is disposed on the support rod. Two leg joints are connected to the outer pipes respectively. Two leg rods are connected to the leg joints respectively. Two brackets are disposed on the outer pipes respectively. Each leg joint has a curved plate receiving the respective leg rod, a sleeve receiving the respective outer pipe, and a curved notch formed between the curved plate and the sleeve. Each outer pipe has a through slot and a through hole. Each inner pipe has a channel. The adjustment joint has a T-shaped plate, a U-shaped frame, a bolt, and two annular pads. The T-shaped plate has a circular hole, a first round aperture, and a second round aperture. The U-shaped frame has a first round hole, a groove communicating with the first round hole, and a second round hole opposite to the first round hole. Each through slot matches the respective channel. The T-shaped plate is inserted in the channels. The bolt passes through the annular pads, the first round hole, the circular hole, and the second round hole. Each bracket has a U-shaped rod and a hollow tube receiving the respective outer pipe.

DETAILED DESCRIPTION OF THE INVENTION

Figure 1:
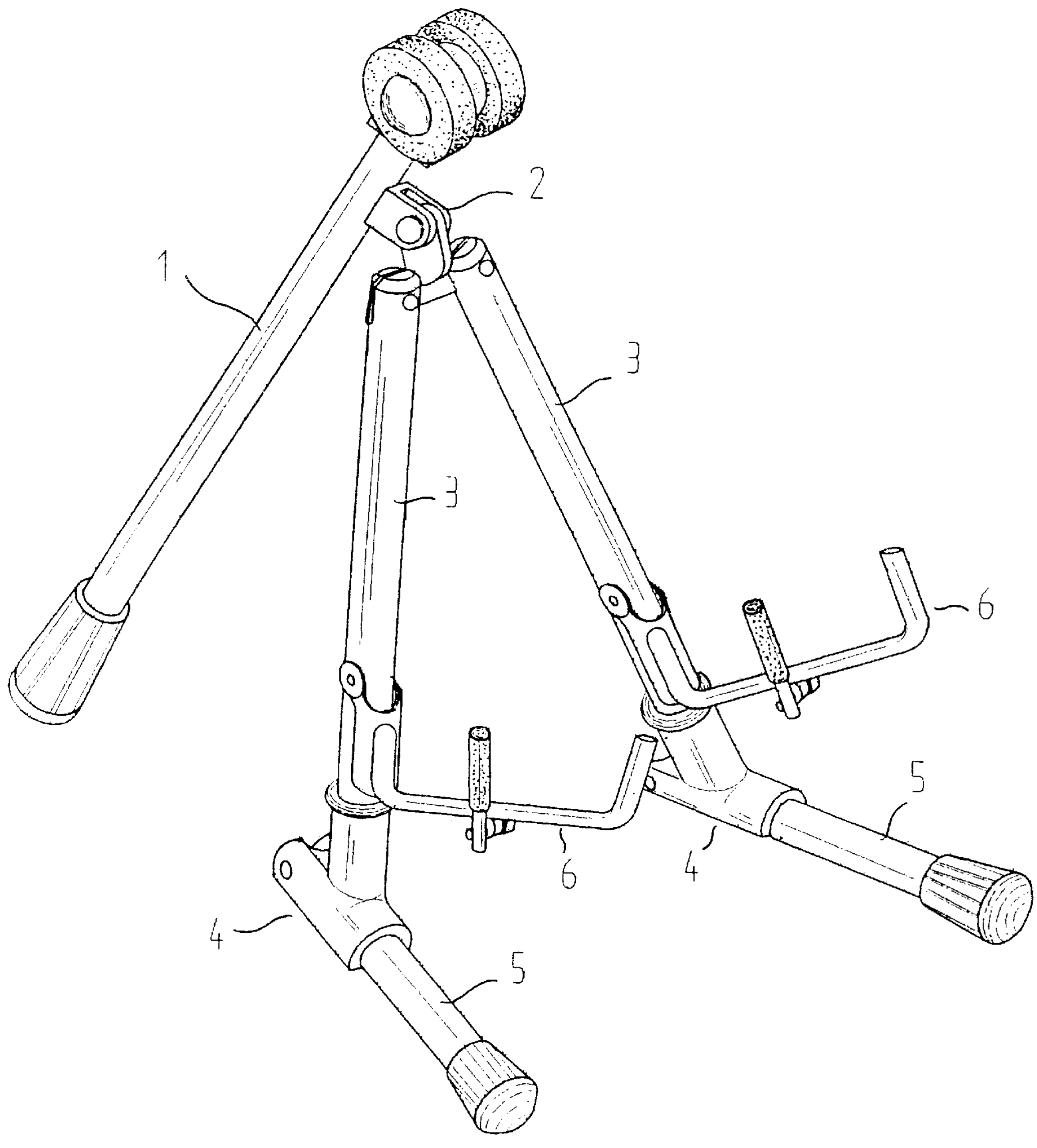
FIG. 1 is a perspective assembly view of a guitar stand of a preferred embodiment in accordance with the present invention.
Figure 2:
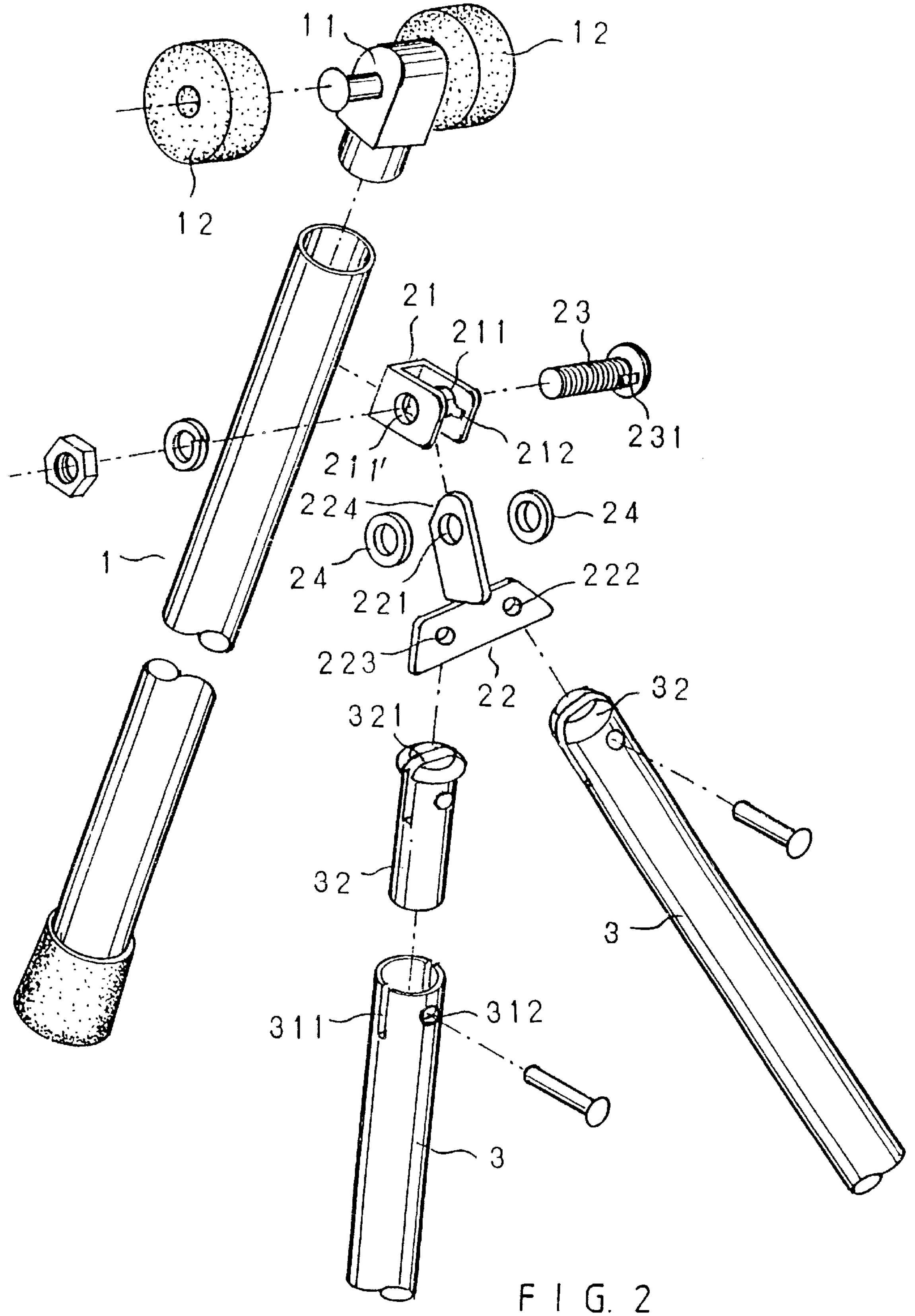
FIG. 2 is a partially perspective exploded view of a guitar stand of a preferred embodiment.
Figure 3:
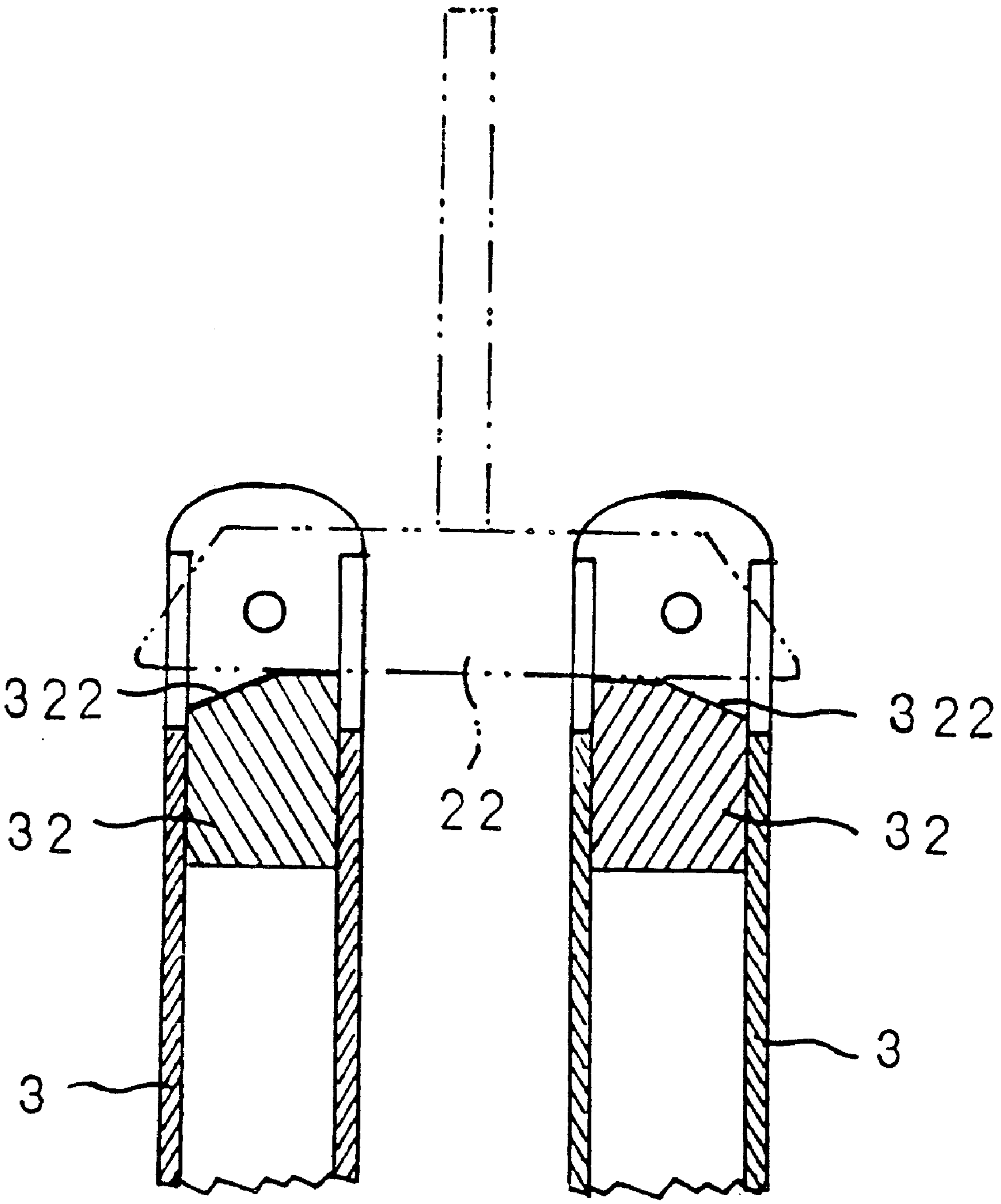
FIG. 3 is a partially sectional view of two hollow rods.
Figure 4:
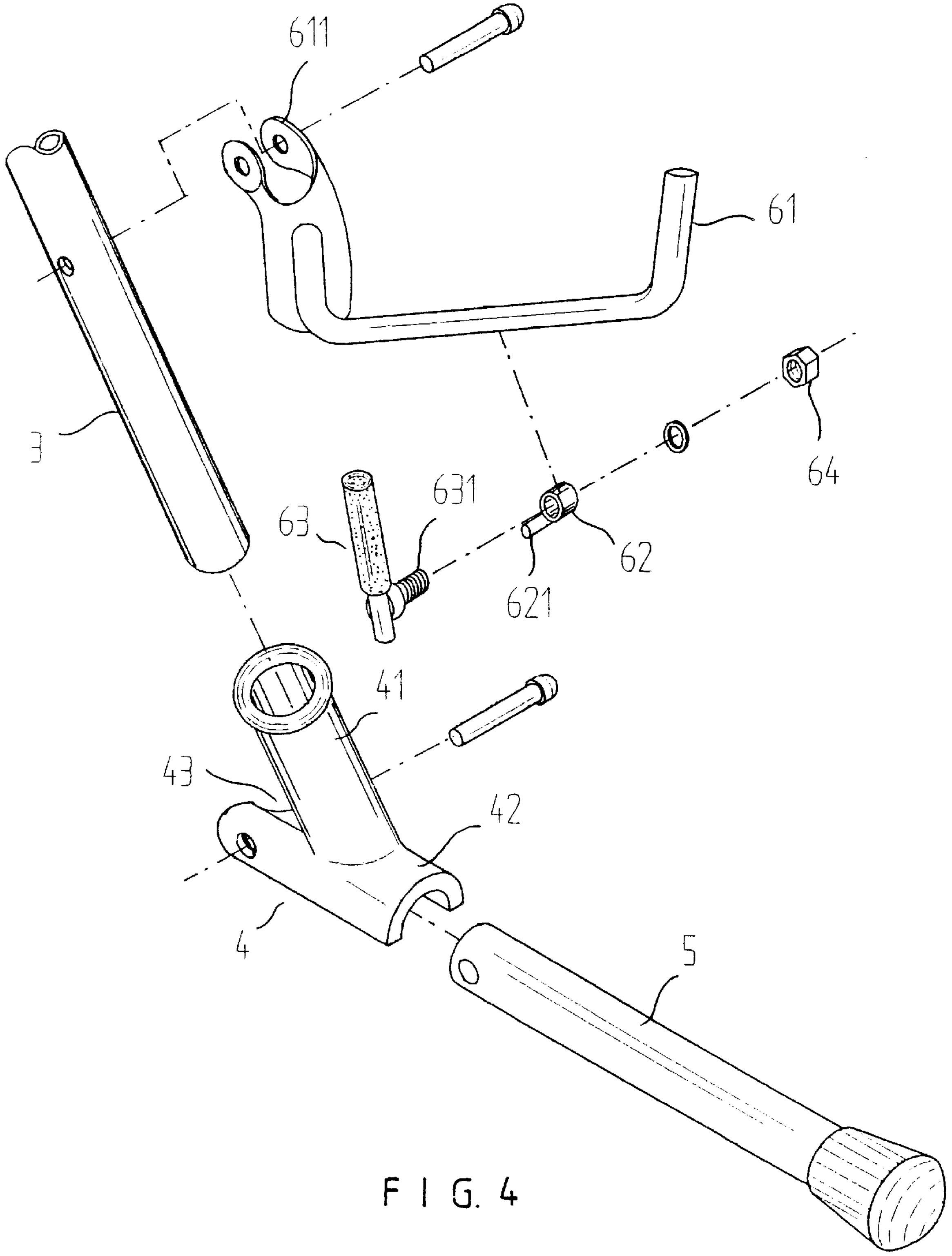
FIG. 4 is a perspective exploded view of a bracket, a hollow rod, a joint, and a leg rod.
Figure 5:
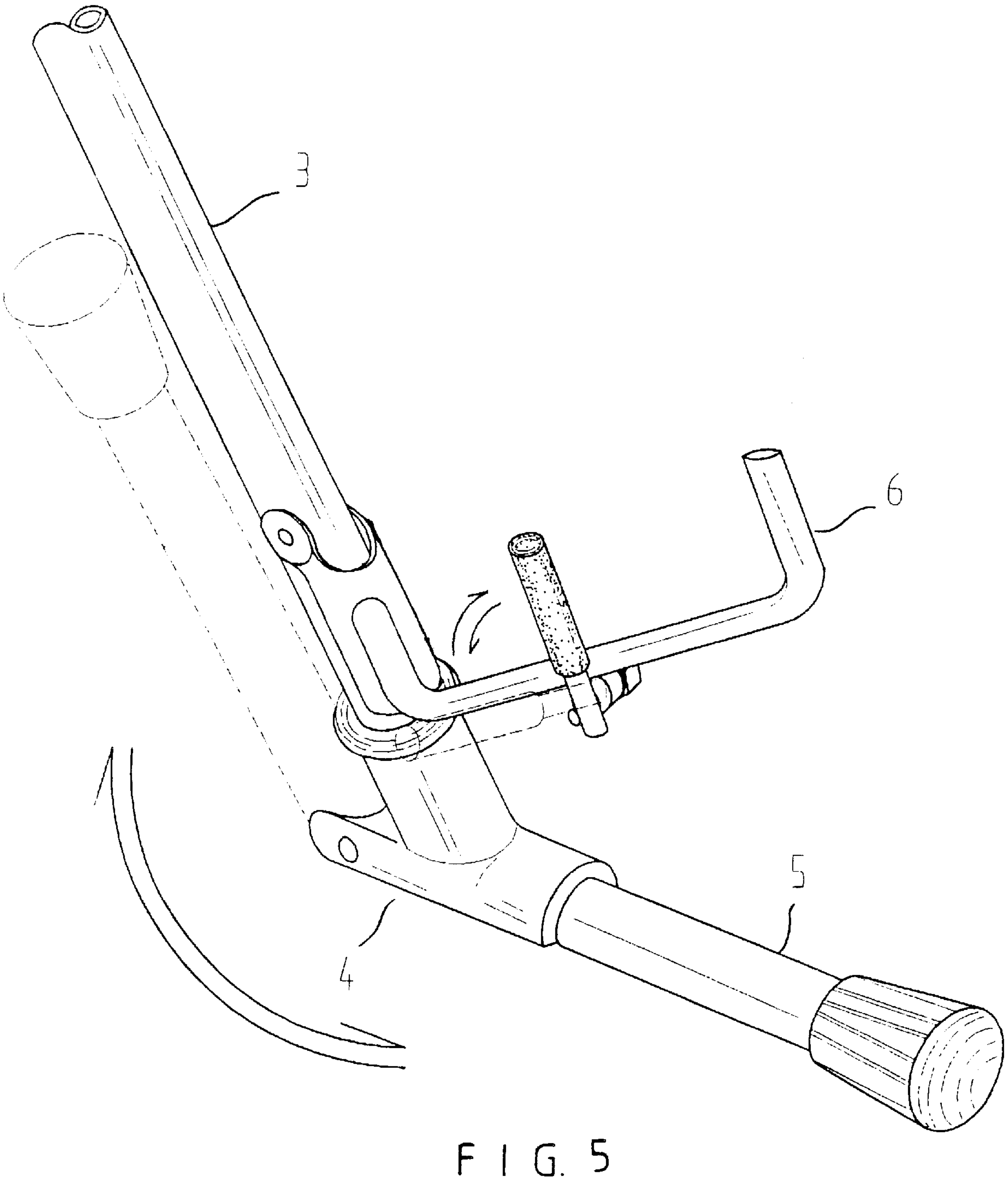
FIG. 5 is a perspective assembly view of FIG. 4.
Figure 6:
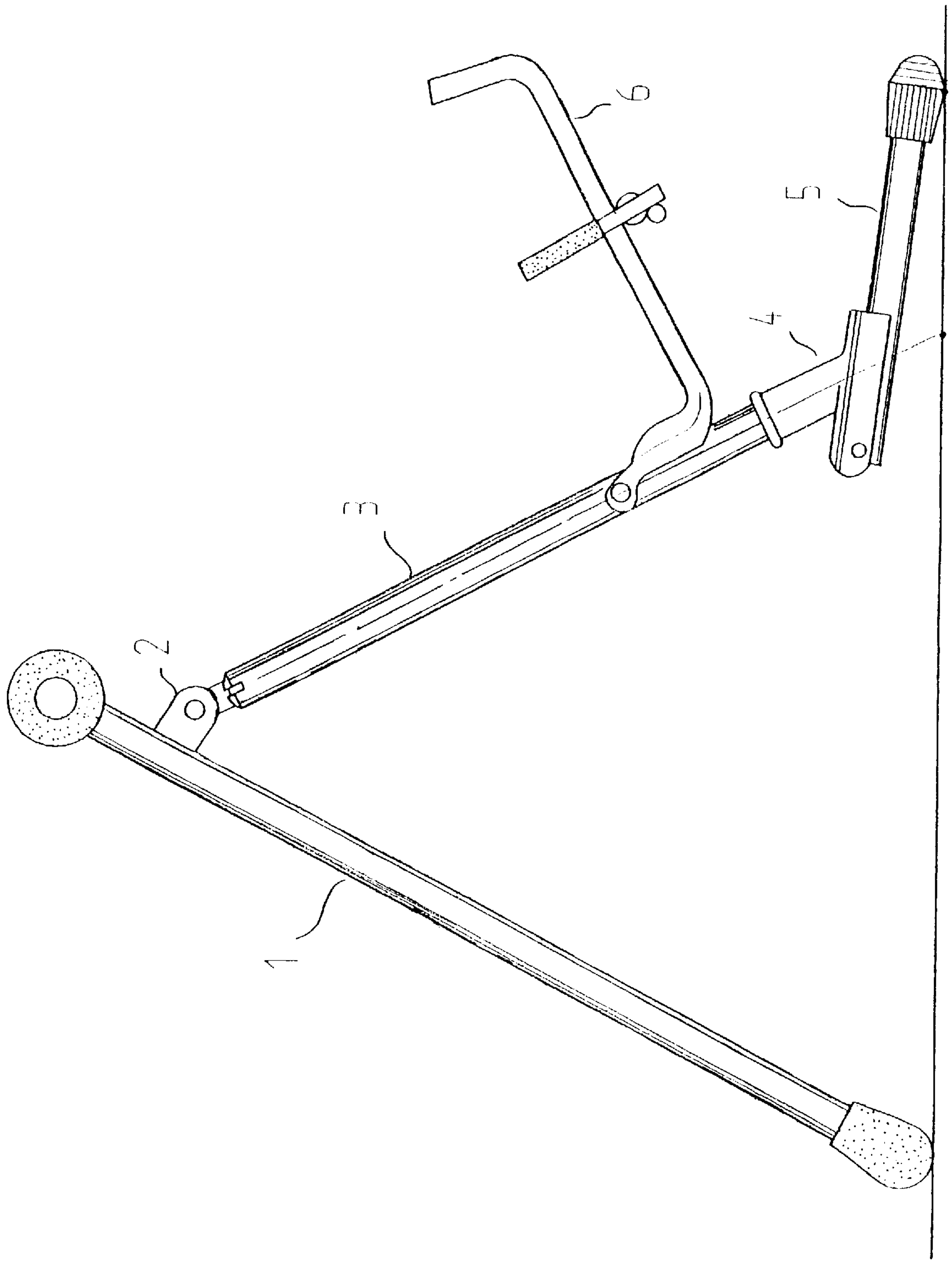
FIG. 6 is an elevational view of a guitar stand of a preferred embodiment in accordance with the present invention.

Referring to FIGS. 1 to 6, a guitar stand comprises an adjustment joint 2, a support rod 1 connected to the adjustment joint 2, two inner pipes 32 connected to the adjustment joint 2, and two outer pipes 3 receiving the inner pipes 32 respectively. An upper block 11 is disposed on the support rod 1. Two round cushions 12 are disposed on the upper block 11. Two leg joints 4 are connected to the outer pipes 3 respectively. Two leg rods 5 are connected to the leg joints 4 respectively. Two brackets 6 are disposed on the outer pipes 3 respectively.

Each leg joint 4 has a curved plate 42 receiving the respective leg rod 5, a sleeve 41 receiving the respective outer pipe 3, and a curved notch 43 formed between the curved plate 42 and the sleeve 41.

Each outer pipe 3 has a through slot 311 and a through hole 312.

Each inner pipe 32 has a channel 321 and two grooves 322 communicating with the channel 321.

The adjustment joint 2 has a T-shaped plate 22, a U-shaped frame 21, a bolt 23, and two annular pads 24. The T-shaped plate 22 has a circular hole 221, a first round aperture 222, and a second round aperture 223. The U-shaped frame 21 has a first round hole 211, a groove 212 communicating with the first round hole 211, and a second round hole 211 opposite to the first round hole 211.

Each through slot 311 matches the respective channel 321. The T-shaped plate 22 is inserted in the channels 321. The bolt 23 passes through the annular pads 24, the first round hole 211, the circular hole 221, and the second round hole 211.

Each bracket 6 has a U-shaped rod 61 and a hollow tube 611 receiving the respective outer pipe 3. The bolt 23 has a protrusion 231. Two cushions 12 are disposed on two laterals of the upper block 11.

The protrusion 231 is inserted in the groove 212. A cambered edge 224 is formed on a top portion of the T-shaped plate 22 to block the U-shaped frame 21 while the T-shaped plate 22 is rotated.

A block rod 63 is disposed on the respective U-shaped rod 61. A screw rod 631 is disposed on a lower end of the block rod 63. A ring 62 receives the screw rod 631. The ring 62 has a protruded bar 621 blocks the block rod 63. A nut 64 fastens the screw rod 631.

Figure 7:
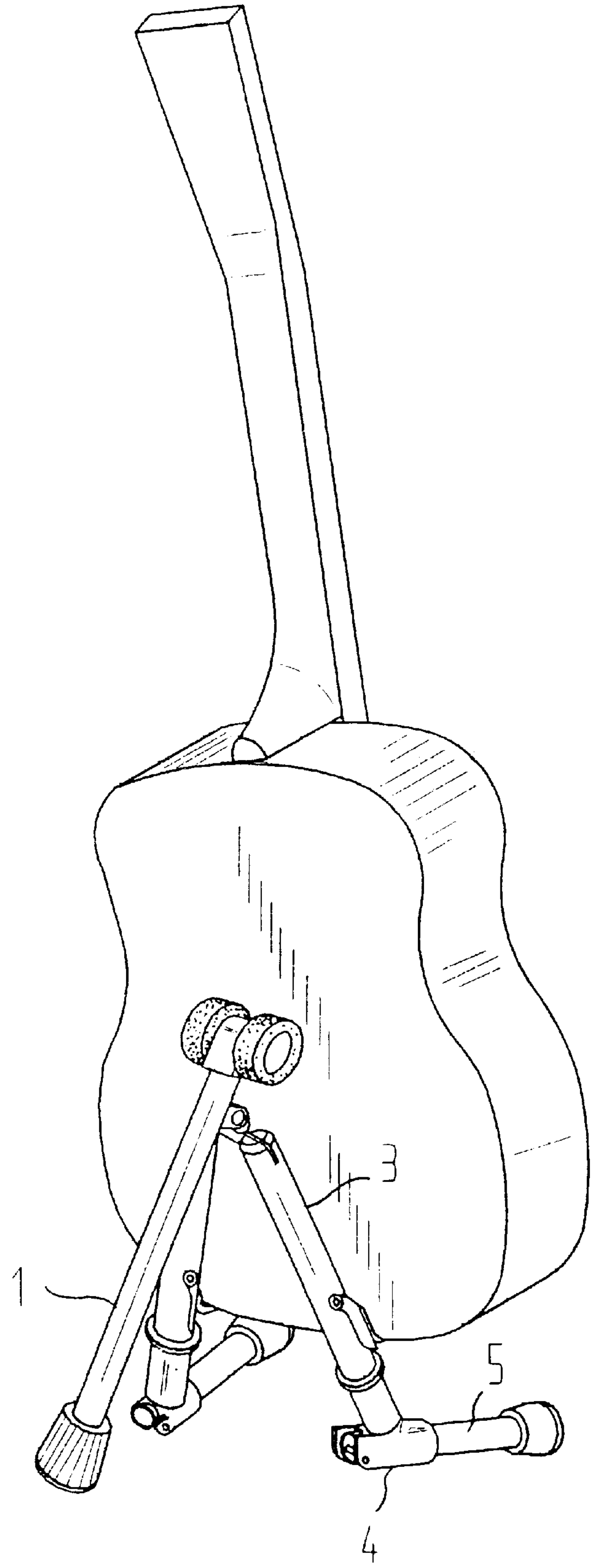
FIG. 7 is a schematic view illustrating an application of a guitar stand of a preferred embodiment in accordance with the present invention.
Figure 8:
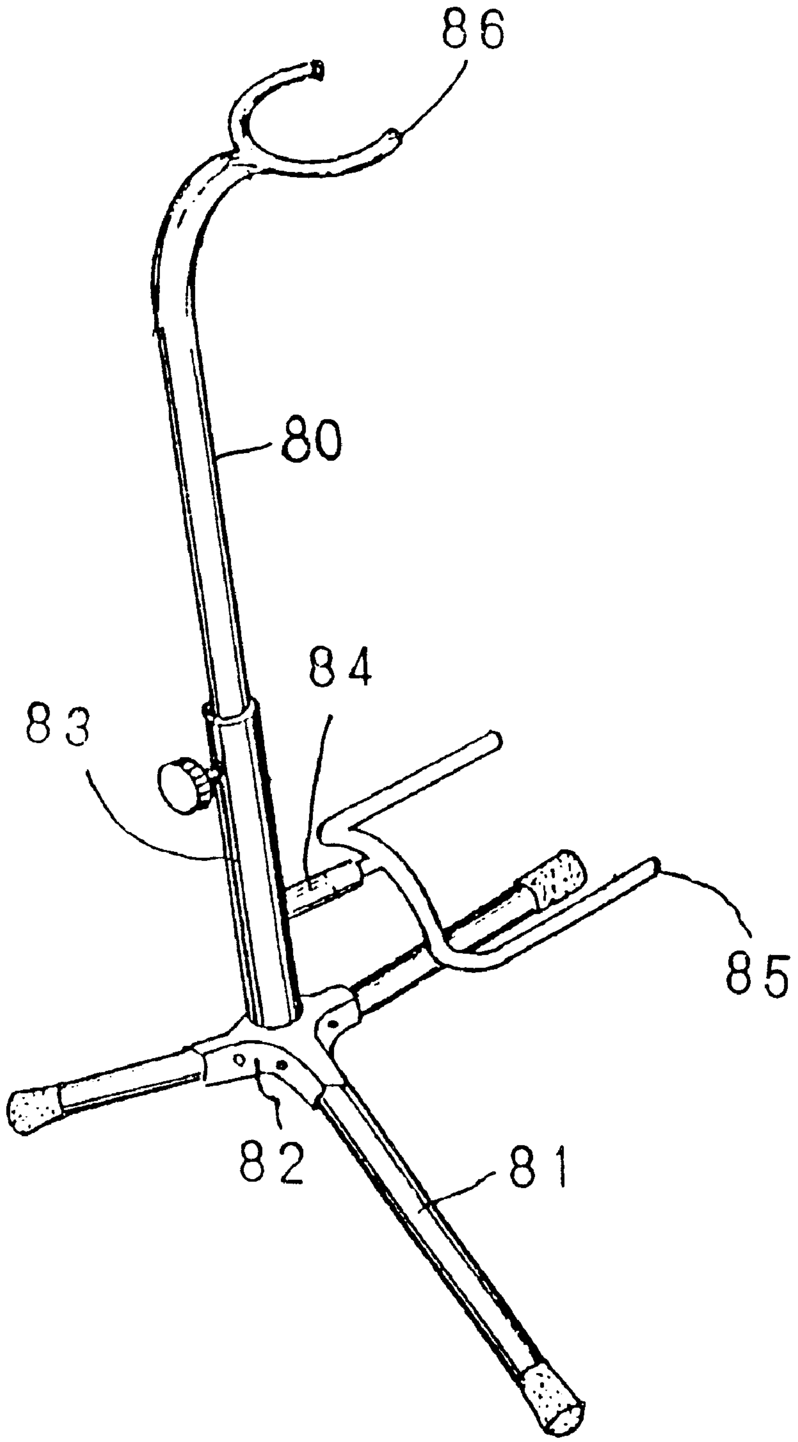
F I G. 8 PRIOR ART
FIG. 8 is a perspective assembly view of a guitar stand of the prior art.

Referring to FIG. 7, a guitar is placed on the guitar stand.

The invention is not limited to the above embodiment but various modification thereof may be made. Further, various changes in form and detail may be made without departing from the scope of the invention.

I claim:

1. A guitar stand comprises:

an adjustment joint, a support rod connected to the adjustment joint, two inner pipes connected to the adjustment joint, and two outer pipes receiving the inner pipes respectively, an upper block disposed on the support rod, two leg joints connected to the outer pipes respectively, two leg rods connected to the leg joints respectively, two brackets disposed on the outer pipes respectively, each said leg joint having a curved plate receiving the respective leg rod, a sleeve receiving the respective outer pipe, and a curved notch formed between the curved plate and the sleeve, each outer pipe having a through slot and a through hole, each inner pipe having a channel, the adjustment joint having a T-shaped plate, a U-shaped frame, a bolt, and two annular pads, the T-shaped plate having a circular hole, a first round aperture, and a second round aperture, the U-shaped frame having a first round hole, a groove communicating with the first round hole, and a second round hole opposite to the first round hole, each through slot matching the respective channel, the T-shaped plate inserted in the channels, the bolt passing through the annular pads, the first round hole, the circular hole, and the second round hole, and each bracket having a U-shaped rod and a hollow tube receiving the respective outer pipe.

2. A guitar stand as claimed in claim 1, wherein the bolt has a protrusion.

3. A guitar stand as claimed in claim 1, wherein two cushions are disposed on two laterals of the upper block.

* * * * *